United States Patent Office 3,309,364
Patented Mar. 14, 1967

3,309,364
N,N-DIPHENYLCARBAMOYL DERIVATIVES OF N-AMINO(CYCLIC AMINES)
Calvin H. Lovell, Morton Grove, Harman S. Lowrie, Glenview, and Peter Yonan, Chicago, Ill., assignors to G. D. Searle & Co., Chicago, Ill., a corporation of Delaware
No Drawing. Filed Nov. 6, 1964, Ser. No. 409,587
5 Claims. (Cl. 260—247.2)

The present invention relates to a group of compounds which are N,N-diphenylcarbamoyl derivatives of N-amino(cyclic amines). From another aspect, the compounds of the present invention can be considered as semicarbazides in which one of the nitrogens is part of a ring system. The present invention particularly relates to a group of compounds having the following general formula

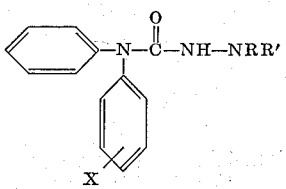

wherein X is selected from the group consisting of hydrogen, methyl, and halogen; and —NRR' is selected from the group consisting of morpholino and 4-substituted 1-piperazinyl. The 4-substituent in the piperazine can be methyl, benzyl, or benzyl having a substituent such as methyl or halogen on the aromatic ring. The various halogens referred to above can be fluorine, chlorine, bromine or iodine.

The compounds of the present invention are conveniently prepared by reacting the appropriate diphenylcarbamoyl chloride with a N-amino(cyclic amine) in an inert solvent. Among useful solvents are aromatic hydrocarbons such as toluene and halogenated hydrocarbons such as methylene chloride and chloroform. The reaction mixture can be heated to promote the reaction.

The compounds of this invention possess valuable pharmacological properties. In particular, they are pepsin inhibitors and anti-inflammatory agents. The latter activity is demonstrated by their phenylbutazone-like effect on edematous conditions. The present compounds also possess anti-biotic activity against a number of organisms. Thus, they inhibit the growth of bacteria such as *Diplococcus pneumoniae* and protozoa such as *Tetrahymena gelleii*. They also inhibit germination of seeds of Trifolium.

The following examples are presented to further illustrate the present invention; they should not be construed as limiting it in spirit or in scope. In these examples, quantities are indicated in parts by weight and temperatures in degrees centigrade (° C.).

EXAMPLE 1

(A) To a solution of 114 parts of 1-(3-methylbenzyl)-piperazine in 350 parts of water and 125 parts of concentrated hydrochloric acid, there is added with stirring a solution of 43 parts of sodium nitrite in 100 parts of water. The resultant mixture is stirred at 50° for 3 hours, it is made alkaline with potassium carbonate and potassium hydroxide solution, and it is then extracted with chloroform. The resultant solution is dried and treated with charcoal and the solvent is removed under reduced pressure to give an oil which is 1-(3-methylbenzyl)-4-nitrosopiperazine.

(B) To a mixture of 58 parts of 1-nitrosopiperazine and 70 parts of potassium carbonate in 400 parts of 2-butanone is added, with stirring, a solution of 81 parts of 4-chlorobenzyl chloride in 160 parts of 2-butanone. The resultant mixture is stirred for 16 hours, 5 parts of sodium iodide is added, and the resultant mixture is refluxed for 4 hours. The resultant mixture is filtered and the solvent is removed from the filtrate to give an oil which crystallizes on standing. This product is 1-(4-chlorobenzyl)-4-nitrosopiperazine.

(C) To a solution of 15.5 parts of lithium aluminum hydride in 1060 parts of ether is added with stirring a solution of 85 parts of 1-(3-methylbenzyl)-4-nitrosopiperazine in 210 parts of ether. The resultant mixture is refluxed for 2 hours and then stirred at room temperature for 16 hours. The resultant mixture is decomposed by the successive addition of 16 parts of water, 12.2 parts of 20% aqueous sodium hydroxide solution, and 57 parts of water. The mixture is filtered to remove the precipitated solids and the filtrate is distilled to give 1-amino-4-(3-methylbenzyl)piperazine boiling at about 124–126° C. at 1 mm. pressure.

In a similar manner, reduction of 92 parts of 1-(4-chlorobenzyl)-4-nitrosopiperazine with 15.2 parts of lithium aluminum hydride gives 1-amino-4-(4-chlorobenzyl)piperazine boiling at about 128–132° C. at 0.3 mm. pressure. This compound crystallizes on standing.

EXAMPLE 2

To a solution of 10 parts of N-(3-chlorophenyl)-N-phenylcarbamoyl chloride in 270 parts of methylene chloride there is added dropwise with stirring at room temperature a solution of 3.5 parts of 1-amino-4-methylpiperazine and 4 parts of triethylamine in 65 parts of methylene chloride. The resultant solution is allowed to stand for 15 hours at 25° C. before it is further diluted with methylene chloride and washed with dilute potassium carbonate solution. The methylene chloride solution is then shaken with saturated sodium chloride solution and dried over anhydrous potassium carbonate. The solvent is evaporated from the reaction mixture under reduced pressure and the residue is dissolved in anhydrous ether, washed first with dilute potassium hydroxide solution and then with water, and then extracted with dilute hydrochloric acid. The combined acid extracts are made alkaline, and the alkaline mixture is extracted with ether. The ether solution is dried, concentrated, and cooled to 0° C. The solid which precipitates as white microprism is 1 - (3 - chlorophenyl) - 1 - phenyl - 3 - (4 - methyl - 1-piperazinyl)urea melting at about 134–135° C. This compound has the following formula

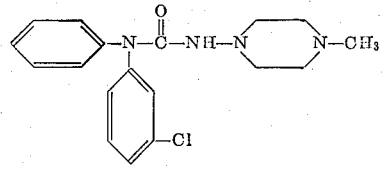

EXAMPLE 3

An equivalent quantity of 4-aminomorpholine is substituted for the 1-amino-4-methylpiperazine and the procedure described in Example 2 is repeated. The product obtained in this way is 1-(3-chlorophenyl)-1-phenyl-3-morpholinourea melting at about 126–127° C.

EXAMPLE 4

To a solution of 10.1 parts of triethylamine and 11.5 parts of 1-amino-4-methylpiperazine in 175 parts of dry toluene there is added a solution of 23.2 parts of diphenylcarbamoyl chloride in 130 parts of dry toluene. During the addition, the mixture is stirred and heated to 40–60° C. The mixture is then stirred for 16 hours at room temperature and the solid which precipitates is separated and washed with toluene. The solvent is then evaporated from the filtrate under reduced pressure and the resultant residue is dissolved in chloroform and washed with dilute potassium hydroxide solution. The organic solution is then dried over potassium carbonate and filtered and the solvent is evaporated at reduced pressure to give an oily residue. This oil is crystallized from ethyl acetate to give 1,1-diphenyl-3-(4-methyl-1-piperazinyl)urea melting at about 156–158° C.

EXAMPLE 5

To a solution of 18.2 parts of 1-amino-4-(3-methylbenzyl)piperazine and 9 parts of triethylamine in 130 parts of anhydrous toluene there is added with stirring and heating to 60° C., a solution of 20.6 parts of diphenylcarbamoyl chloride. The resultant mixture is stirred and heated at 60° C. for 4 hours and then allowed to stand for 16 hours. The resultant precipitate is filtered and washed with toluene and the solvent is evaporated from the combined filtrates. The resulting oil is dissolved in ether and filtered to remove a small amount of insoluble material. A precipitate forms when an attempt is made to wash the ether solution with water. The mixture is then filtered to remove the solid and the organic layer is diluted with chloroform. The organic solution is then dried over potassium carbonate and concentrated to dryness under reduced pressure. The resultant oil is triturated with ether and the solid which forms is crystallized from a mixture of ethyl acetate and hexane to give 1,1 - diphenyl - 3-[4-(3 - methylbenzyl) - 1 - piperazinyl] urea melting at about 118–121° C. This compound has the following formula

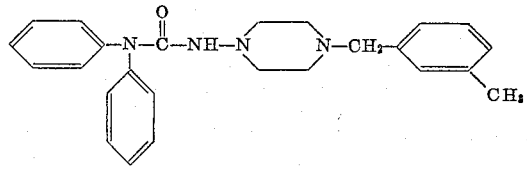

EXAMPLE 6

If diphenylcarbamoyl chloride is reacted with the appropriate 1-aminopiperazine according to the procedure described in Example 5, the following compounds are obtained:

1,1-diphenyl-3-(4-benzyl-1-piperazinyl)urea.
1,1-diphenyl-3-[4-(4-chlorobenzyl)-1-piperazinyl]urea.

EXAMPLE 7

A solution of 10 parts of diphenylcarbamoyl chloride and 5 parts of 4-aminomorpholine in 90 parts of chloroform is heated on a steam bath for 30 minutes during which time most of the solvent evaporates. Crystals form during this time. Ether is added to the mixture which is then filtered to separate the crystals. The solid is then dissolved in chloroform and washed with dilute sodium hydroxide solution. The chloroform layer is dried and concentrated to a small volume. The addition of pentane causes crystals to form. This solid is separated and recrystallized from a mixture of benzene and hexane to give 1,1-diphenyl-3-morpholinourea melting at about 144–146° C. This compound has the following formula

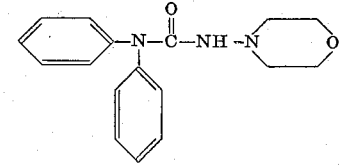

What is claimed is:
1. A compound of the formula

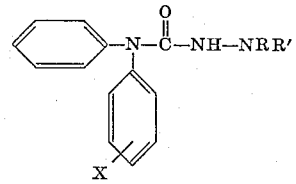

wherein X is selected from the group consisting of hydrogen and chlorine and —NRR' is selected from the group consisting of morpholino, 4-methyl-1-piperazinyl and

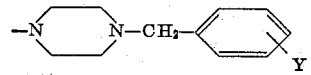

wherein Y is selected from the group consisting of hydrogen, methyl, and chlorine.
2. 1,1-diphenyl-3-morpholinourea.
3. 1-(3-chlorophenyl)-1-phenyl-3-morpholinourea.
4. 1,1-diphenyl-3-(4-methyl-1-piperazinyl)urea.
5. 1-(3-chlorophenyl)-1-phenyl - 3 - (4 - methyl-1-piperazinyl)urea.

References Cited by the Examiner
UNITED STATES PATENTS
2,663,707  12/1953  Conroy et al. _____ 260—268

ALEX MAZEL, *Primary Examiner.*
JOSE TOVAR, *Assistant Examiner.*